(No Model.)

F. J. FERRELL.
VALVE.

No. 462,762.  Patented Nov. 10, 1891.

Witnesses
Geo. W. Breck
Edward Thorpe

Inventor
Frank J. Ferrell
By his Attorney
Henry D. Williams

UNITED STATES PATENT OFFICE.

FRANK J. FERRELL, OF NEW YORK, N. Y., ASSIGNOR TO THE FERRELL MANUFACTURING COMPANY, OF NEW JERSEY.

VALVE.

SPECIFICATION forming part of Letters Patent No. 462,762, dated November 10, 1891.

Application filed May 27, 1890. Serial No. 353,314. (No model.)

*To all whom it may concern:*

Be it known that I, FRANK J. FERRELL, a citizen of the United States, residing at New York, county and State of New York, have invented certain new and useful Improvements in Valves, of which the following is a specification, reference being had to the accompanying drawings, forming part hereof.

This invention relates to valves for regulating and controlling fluids, and has for its object to improve the construction of such valves, to provide means for readily and quickly operating them, and to provide indicators for visually indicating the exact amount of opening of such valves.

The invention comprises various improvements in the construction of such valves, which I will now particularly describe in connection with the accompanying drawings.

Figure 1:
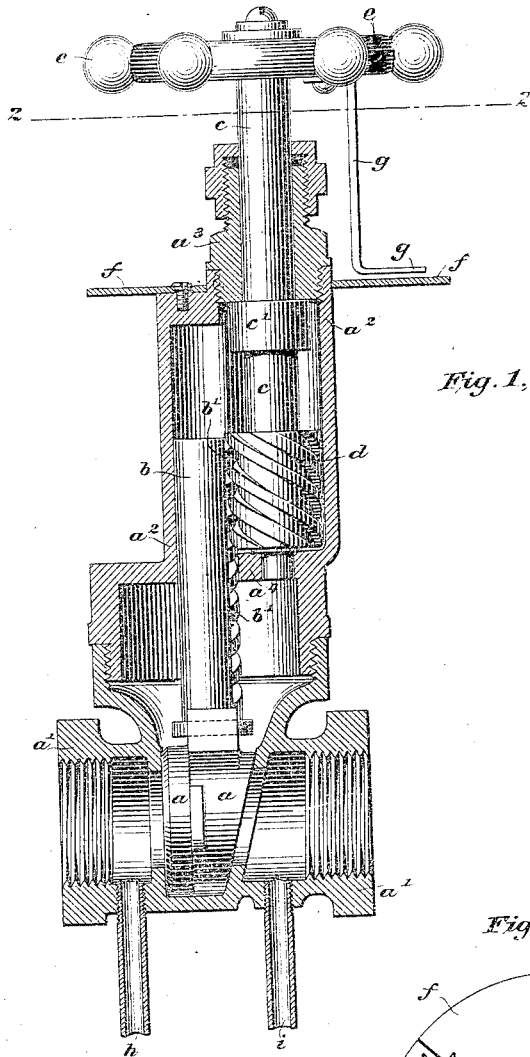
Figure 3:
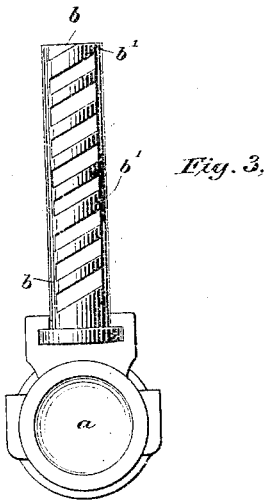
Figure 2:
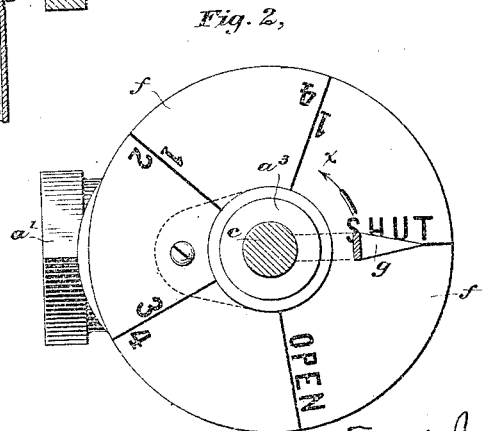

In the drawings, Figure 1 is a vertical longitudinal section of a complete valve embodying my improvements. Fig. 2 is a horizontal section of the same on the line 2 2, Fig. 1. Fig. 3 is a detached end elevation of the valve-stem and valve.

The valve shown in the drawings is a sliding gate-valve, and the invention is particularly adapted for such valves. The casing is composed of two parts screwed together, the lower part $a'$ containing the sliding valve $a$ and its seat and ports, and the upper part $a^2$ containing the operating mechanism. The valve $a$ is wedge-shaped to insure tight closure, and is fitted to slide in guides in the casing in the usual manner. The valve-stem $b$ is cylindrical and has a collar at its lower end and fits loosely within a lug extending up from the valve $a$, the collar working in grooves in the lug. This connection causes the valve and stem to move together in opening or closing the valve and yet allows sufficient freedom to permit the valve to tightly seat itself when in closed position. It also permits the valve to be readily detached from the stem when the parts $a'$ and $a^2$ of the casing have been unscrewed and separated. The valve-stem $b$ is fitted to move longitudinally in a cylindrical bearing in the upper part $a^2$ of the casing. Teeth are formed upon the valve-stem $b$, adapted to mesh into the teeth of a worm on the operating-stem. This operating-stem is cylindrical, and is fitted to rotate only in bearings in the upper part $a^2$ of the casing. The cylindrical bearing of the valve-stem $b$ and the cylindrical chamber or bearing of the operating-stem $c$ are arranged side by side and intersect, the slot or opening on their line of intersection being just wide enough to permit proper meshing of the teeth on the valve-stem and the thread of the worm on the operating-stem. The valve-stem is thus provided with a continuous bearing extending through the greater part of its length. The lower end of the operating-stem is provided with the screw-thread or worm $d$, which is arranged close to the valve-stem $b$ and so as to mesh into the teeth of the valve-stem. The teeth upon the valve-stem $c$ are shown as formed by cutting grooves at the same inclination as the threads of the worm; but it is evident that the form of these teeth may be varied without departing from my invention. The form of the teeth on the valve-stem $b$ is such that when these teeth are interlocked with the teeth of the worm $d$ the valve-stem $b$ is prevented from turning sufficiently to disengage the teeth. Rotary movement imparted to the operating-shaft will cause the teeth of the worm $d$ to act upon the teeth of the valve-stem $b$ and will move the valve-stem and attached valve longitudinally, and thus open or close the valve. One of the grooves in the worm $d$ and its corresponding teeth $b'$ in the valve-stem $b$ are considerably larger than the other grooves and teeth, so that when the parts of the valve are assembled the upper large tooth $b'$ will enter only the large groove in the worm $d$. This construction makes certain that the teeth of the worm $d$ will always mesh with the same teeth of the valve-stem $b$. As a result of this construction the position of the worm will always indicate the amount of opening of the valve. The pitch of the worm is adjusted so that one full stroke of the valve will be caused by about one revolution of the worm. In the construction shown the stroke of the valve is effected by less than one revolution of the worm. It is therefore possible to obtain a visual indication of the exact position of the valve by means of an index attached to the valve-operating stem $c$. Such index is provided and will be hereinafter described.

The lower end of the worm $d$ works against the bearing $a^4$ of the lower end of the operating-stem $c$. A collar $c'$ is provided on the operating-stem $c$, which works against the lower face of the upper bearing $a^3$ of the operating-stem $c$. This upper bearing $a^3$ is detachable to permit ready removal of the operating-stem. The thrust of the worm is received by these bearings $a^3$ and $a^4$, and the worm is thus prevented from moving longitudinally. The collar $c'$ acts both as a thrust-bearing and as a packing, as it will in the operation of the valve be held tightly against the face of the bearing $a^3$. The cylindrical chamber in which the worm is located and fitted intersects the cylindrical bearing of the valve-stem, as above described, the connecting-slot permitting the meshing of the rack and worm. These bearings are compact and light and guide the moving parts smoothly and prevent displacement or derangement of the moving parts, while permitting them to be readily taken apart and replaced and allowing ready access to all portions of the interior of the valve-casing.

The operating mechanism and the valve $a$ can be separated and the valve removed by unscrewing the upper part $a^2$ of the casing and then removing the valve $a$ from its stem $b$. The valve-stem $b$ can be removed by turning the operating-stem $c$ so as to push the valve-stem down and out. The operating-stem can then be removed by unscrewing its upper bearing $a^3$. In putting the parts together the reverse order is followed.

The bearing $a^4$ of the lower end of the operating-stem $c$ is formed in partition or lug of the upper part $a^2$ of the casing. The bearing $a^3$ for the upper end of the operating-stem $c$ is, as above described, fitted to screw into the upper part $a^2$ of the casing, so that it may be unscrewed and removed to permit insertion or removal of the operating-stem $c$. The upper end of this bearing $a^3$ is provided with a packing, which may be an ordinary stuffing-box, as shown, or any ordinary steam-tight packing. As the operating-stem rotates without longitudinal movement, any ordinary anti-friction collar-packing may be used, and with any packing the joint can be kept perfectly tight.

The upper end of the operating-stem $c$ is provided with a hand-wheel $e$, secured thereto, whereby the stem may be rotated and the valve operated.

The indicating-plate $f$ is suitably secured to the upper part $a^2$ of the casing. It consists of a circular disk arranged concentrically with the operating-stem $c$ and provided with suitable markings indicating the position of the valve. The index $g$ is secured to the hand-wheel $e$ and extends downward, and is bent so that its lower part is parallel to the indicating-disk $f$. The markings upon the indicating-disk divide the stroke into quarters; but it is obvious that greater or smaller fractions may be indicated.

In the position of the parts shown in the drawings the valve is closed and the index is therefore opposite the mark "Shut." (See Fig. 1.) As the operating-stem is turned in the direction of the arrow $x$, the valve is opened and the index $g$, by its position in relation to the indicating-disk, visually exhibits the exact amount of opening. It is evident that the valve mechanism may be constructed to operate by turning the operating-stem in opposite directions by changing the direction of the threads of the worm $d$ and of the teeth in the valve-stem $b$.

When my valve is used as a throttle-valve, I provide a drip-pipe $h$ and an oil-pipe $i$, tapped into the casing. The drip-pipe is on the steam-supply side and is for the purpose of removing water of condensation. The oil-pipe is on the opposite side of the valve, and is for the purpose of charging the steam with lubricating-oil, which will flow with the steam into the engine and lubricate the valves and piston of the engine.

It will be observed that in my improved valve the operating mechanism, although simple, compact, and inexpensive, permits a long stroke of the valve with less than a single revolution of the operating-stem. The valve will be held in any position to which it is moved. The only part of the mechanism that projects outside of the casing is a rotating stem, and the valve can therefore be easily kept perfectly tight.

The valve can be readily put together or taken apart, and when the parts are assembled they must always occupy the same relative positions.

The valve and the valve-stem and the operating-stem can be readily detached and separated and either one can be separately replaced when worn out.

The indications of the position of the valve are correct and unmistakable.

The valve can be kept free of water of condensation and the steam passing through the valve can be readily charged with lubricating-oil.

Having now described my invention, what I claim as new, and desire to secure by Letters Patent, is—

1. The combination, with a valve and casing, of an operating-stem provided with a worm and fitted to rotate, a valve-stem on the valve provided with teeth meshing in such worm and fitted to move longitudinally, the teeth of the worm and on the valve-stem being differently sized and spaced, so that when meshed together the same teeth will always interlock, an indicating-plate on the casing, and an index on the operating-stem arranged adjacent to the face of the indicating-plate, substantially as set forth.

2. The combination, with a valve and casing, of the operating-stem $c$, fitted to rotate in the bearings $a^3$ $a^4$ of the upper part $a^2$ of the valve-casing, the worm $d$ on the operating-stem $c$, the valve-stem $b$, fitted to move longitudinally in a bearing in the upper part $a^2$ of the casing, connected to the valve, and provided with inclined teeth meshing into the teeth of the worm $d$, one of said teeth $b'$ being larger than the others and adapted to interlock in only one groove to the worm $d$, the indicating-plate $f$ on the casing, and the index $g$ on the operating-stem $c$, arranged adjacent to the face of the indicating-plate, substantially as set forth.

FRANK J. FERRELL.

Witnesses:
 HENRY D. WILLIAMS,
 EDWIN SEGER.